(No Model.) 2 Sheets—Sheet 1.

W. P. HARRISON
DISH CLEANER.

No. 528,875. Patented Nov. 6, 1894.

Witnesses
Geo. E. Frech
James W. Burns

Inventor
W. P. Harrison
per
Lehmann Pattison & Nesbit
atty (No Model.) 2 Sheets—Sheet 2.
W. P. HARRISON.
DISH CLEANER.
No. 528,875. Patented Nov. 6, 1894.
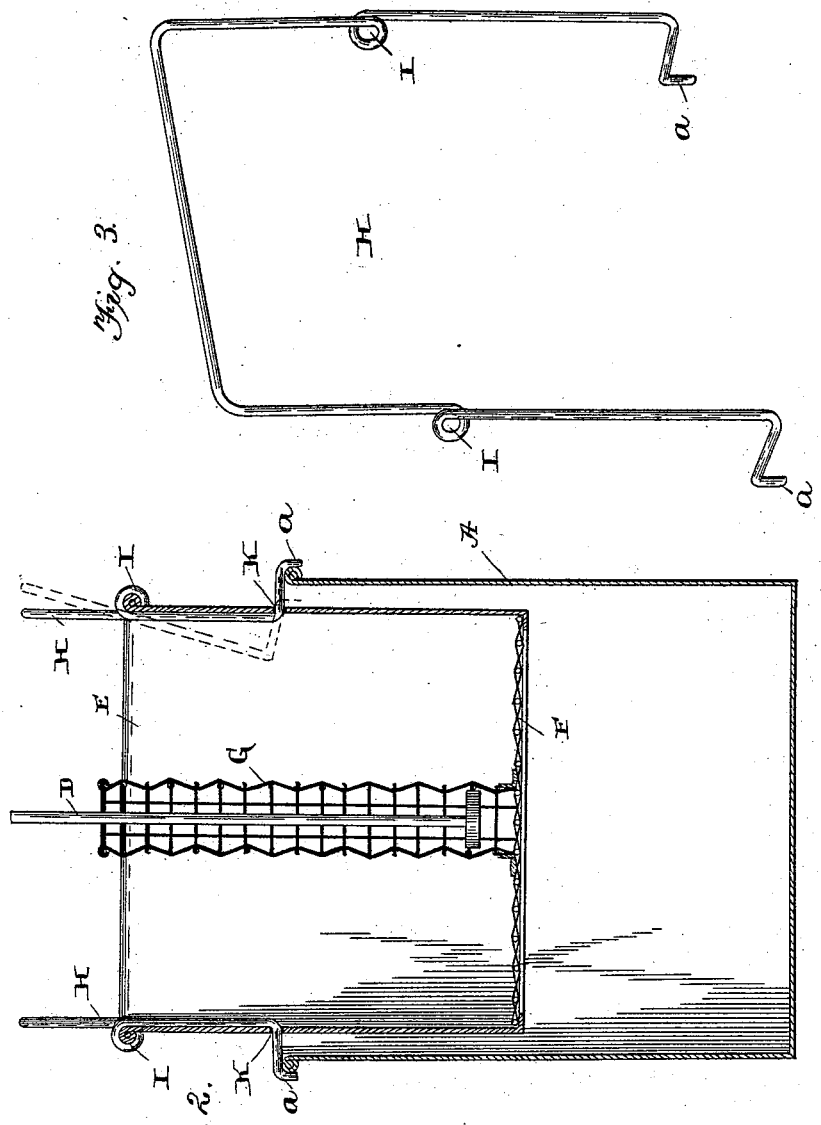

UNITED STATES PATENT OFFICE.

WILLIAM P. HARRISON, OF COLUMBUS, OHIO.

DISH-CLEANER.

SPECIFICATION forming part of Letters Patent No. 528,875, dated November 6, 1894.

Application filed June 16, 1894. Serial No. 514,789. (No model.)

*To all whom it may concern:*

Be it known that I, WILLIAM P. HARRISON, of Columbus, in the county of Franklin and State of Ohio, have invented certain new and useful Improvements in Dish-Washers; and I do hereby declare the following to be a full, clear, and exact description of the invention, such as will enable others skilled in the art to which it pertains to make and use it, reference being had to the accompanying drawings, which form part of this specification.

My invention relates to improvements in dish washers, and it consists in the particular construction and combination of parts which will be fully described hereinafter and particularly referred to in the claims.

The object of my invention is to provide a dish washer consisting of a tray having preferably imperforate sides and a perforated or wire bottom (preferably the latter) and extending from the center of this bottom a wire cylinder in which a plunger is used for agitating the water around the dishes and thoroughly washing the same; and to provide the said tray with intermediately pivoted handles, whereby the tray can be partially removed from the boiler or receptacle in which it is placed and by turning the lower ends of the handles outward supported on the upper edge of the same to allow the dishes to drain, after which the tray can be set over the stove and the dishes thoroughly dried in a few minutes.

Figure 1:
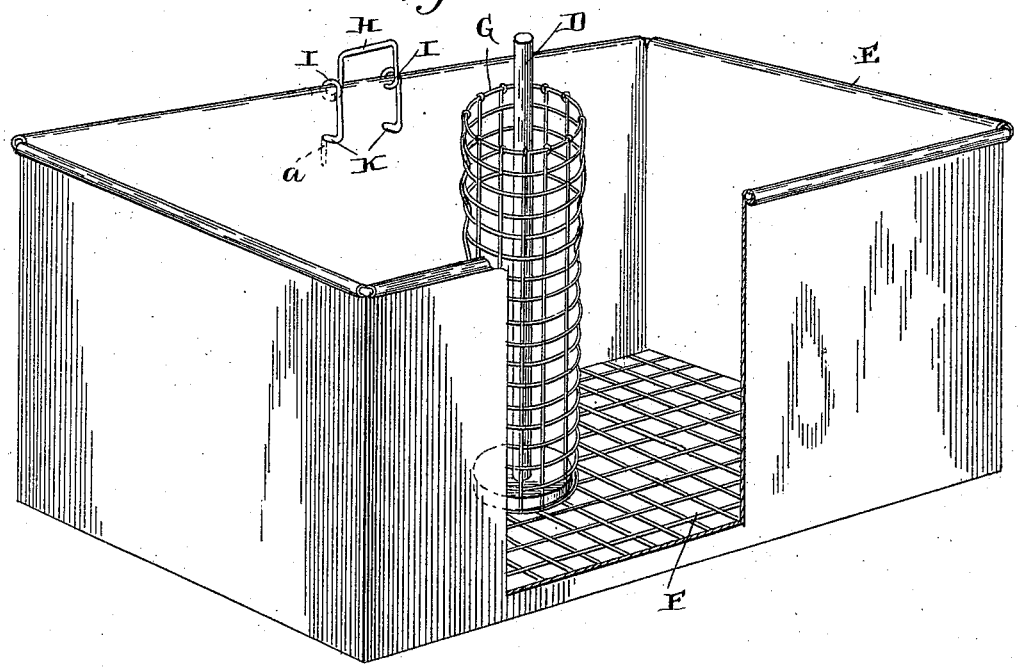
Figure 4:
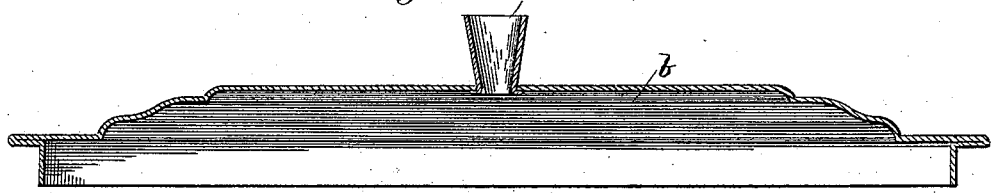

In the accompanying drawings:—Figure 1 is a detached perspective view of the tray removed from the boiler or receptacle, and the plunger shown in position therein. Fig. 2 is a longitudinal sectional view of the boiler with the tray set therein and supported by the handles. Fig. 3 is a detached view of one of the handles, and Fig. 4 a view of the top or cover.

A indicates a boiler or other receptacle which is provided with a cover b having a central flanged opening C, through which the handle of the plunger D passes as will be readily understood to be reciprocated for the purpose of agitating the water within the receptacle and washing the dishes.

E is a tray having preferably imperforate side walls and a wire bottom F. Extending upward from the bottom of this wire bottom F is a wire cylinder G, in which is placed the plunger.

At each side of the tray are the handles H which have the eyelets I which form intermediate pivotal points therefor as shown, and their lower ends extend along inside of the said tray and extend outward through openings K made in the wide walls thereof, said lower ends being bent downward as shown at a, to rest against the outer side of the edge of the boiler A, and to form supports for the said tray as clearly shown in Fig. 3.

In operation the dishes are placed within the tray around the wire cylinder, and the boiler filled about half full of hot water and preferably placed upon the stove. The water is thoroughly soaped, and the tray of dishes set therein with the cover over them. The plunger is then reciprocated within the said wire cylinder and the water within the tray is violently agitated which thoroughly washes the dishes. This being down the tray is elevated and supported upon the handles until the dishes have thoroughly drained, when it is removed from the boiler and the dishes allowed to dry over a stove or otherwise.

From the above description it will be seen that I have produced a very simple and effective dish washer, the same being simple and cheap to manufacture.

Having thus described my invention, what I claim, and desire to secure by Letters Patent, is—

1. The combination with a tray or other receptacle having openings in its sides, of intermediately pivoted handles having their lower portions extending along the inner side of the tray and their lower ends bent laterally through said openings to form supports for the receptacle, substantially as specified.

2. The combination with a tray or other receptacle of handles intermediately pivoted to said tray, the walls of the tray having openings below the said pivotal points of the handles, and the lower portion of said handles extending along the inner side of the tray, bent outward through said openings and then downward substantially as shown.

In testimony whereof I affix my signature in presence of two witnesses.

WILLIAM P. HARRISON.

Witnesses:
   TOD B. GALLOWAY,
   MATTIE M. HEADLEY.